United States Patent
Ikeda

(10) Patent No.: US 12,075,036 B2
(45) Date of Patent: Aug. 27, 2024

(54) IMAGE PROCESSING DEVICE AND IMAGE PROCESSING METHOD

(71) Applicant: Sony Group Corporation, Tokyo (JP)

(72) Inventor: Masaru Ikeda, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 157 days.

(21) Appl. No.: 17/634,993

(22) PCT Filed: Sep. 3, 2020

(86) PCT No.: PCT/JP2020/033468
§ 371 (c)(1),
(2) Date: Feb. 14, 2022

(87) PCT Pub. No.: WO2021/045162
PCT Pub. Date: Mar. 11, 2021

(65) Prior Publication Data
US 2022/0295055 A1    Sep. 15, 2022

Related U.S. Application Data

(60) Provisional application No. 62/897,038, filed on Sep. 6, 2019.

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/176* (2014.11); *H04N 19/186* (2014.11); *H04N 19/70* (2014.11); *H04N 19/82* (2014.11)

(58) Field of Classification Search
CPC .. H04N 19/117; H04N 19/176; H04N 19/186; H04N 19/70; H04N 19/82
See application file for complete search history.

(56) References Cited

U.S. PATENT DOCUMENTS

| 11,616,987 B2 * | 3/2023 | Jeong | H04N 19/172 |
|---|---|---|---|
| | | | 375/240.29 |
| 2007/0121728 A1 * | 5/2007 | Wang | H04N 19/51 |
| | | | 375/E7.113 |

(Continued)

FOREIGN PATENT DOCUMENTS

| CN | 101218831 A | * | 6/2006 | |
|---|---|---|---|---|
| CN | 101218831 A | * | 7/2008 | H04N 19/00 |

(Continued)

OTHER PUBLICATIONS

Hey, Jongri translation of KR 101461370 B1 Feb. 2014 (Year: 2014).*

(Continued)

*Primary Examiner* — Zaihan Jiang
(74) *Attorney, Agent, or Firm* — XSENSUS LLP

(57) ABSTRACT

The present technology relates to an image processing device and an image processing method enabling the image quality to be improved. A color difference offset parameter set used when applying a deblocking filter to a color difference component of a decoded image obtained by decoding a bitstream is set. The image is encoded to generate a bitstream including the color difference offset parameter set. The bitstream is decoded to generate a decoded image. A deblocking filter is applied to the color difference component of the pixels near a block boundary of the decoded image using the color difference offset parameter set. The present technology can be applied when encoding and decoding an image.

15 Claims, 12 Drawing Sheets

(51) Int. Cl.
*H04N 19/186* (2014.01)
*H04N 19/70* (2014.01)
*H04N 19/82* (2014.01)

(56) References Cited

U.S. PATENT DOCUMENTS

| | | | | |
|---|---|---|---|---|
| 2007/0140355 | A1* | 6/2007 | Uchida | H04N 19/61 375/E7.093 |
| 2007/0147511 | A1* | 6/2007 | Ogawa | H04N 19/80 375/E7.193 |
| 2008/0069247 | A1 | 3/2008 | He | |
| 2008/0240252 | A1 | 10/2008 | He | |
| 2008/0292505 | A1* | 11/2008 | Tian | B01L 3/021 422/400 |
| 2013/0022103 | A1* | 1/2013 | Budagavi | H04N 19/86 375/E7.135 |
| 2013/0182759 | A1* | 7/2013 | Kim | H04N 19/117 375/240.02 |
| 2016/0100168 | A1* | 4/2016 | Rapaka | H04N 19/186 375/240.03 |
| 2016/0105675 | A1* | 4/2016 | Tourapis | H04N 19/196 375/240.02 |
| 2017/0064301 | A1* | 3/2017 | Ma | H04N 19/70 |
| 2017/0295369 | A1* | 10/2017 | Nakagami | H04N 19/86 |
| 2022/0141458 | A1* | 5/2022 | Sakurai | H04N 19/124 375/240.02 |

FOREIGN PATENT DOCUMENTS

| | | | |
|---|---|---|---|
| CN | 104380731 A | 2/2015 | |
| CN | 104584560 A | 4/2015 | |
| KR | 101461370 B1 * | 2/2014 | |
| KR | 101461370 B1 * | 11/2014 | |
| WO | WO-2011155378 A1 | 12/2011 | |
| WO | WO 2013001752 A1 * | 6/2012 | |
| WO | WO-2013001752 A1 * | 1/2013 | F02D 23/00 |
| WO | 2016/056398 A1 | 4/2016 | |

OTHER PUBLICATIONS

Hey, Jongri translation of KR 101461370 B1 Nov. 14, 2014 (Year: 2014).*
Sekiguchi, Shunichi translation of CN 101218831 A Jun. 2006 (Year: 2006).*
International Search Report and Written Opinion mailed on Nov. 24, 2020, received for PCT Application PCT/JP2020/033468, Filed on Sep. 3, 2020, 9 pages including English Translation.
Bross et al., "Versatile Video Coding (Draft 6)", Joint Video Experts Team (JVET) of ITU-T SG 16 WP 3 and ISO/IEC JTC 1/SC 29/WG 11, JVET-O2001-v14, Jul. 3-12, 2019, 455 pages.
Chen et al., "Algorithm Description for Versatile Video Coding and Test Model 6 (VTM 6)", Joint Video Experts Team (JVET) of ITU-T SG 16 WP 3 and ISO/IEC JTC 1/SC 29/WG 11, JVET-O2002-v1, Jul. 3-12, 2019, 89 pages.
Kim et al., "AhG5: Deblocking Filter in 4:4:4 Chroma Format", Joint Video Experts Team (JVET) of ITU-T SG 16 WP 3 and ISO/IEC JTC 1/SC 29/WG 11, JCTVC-O0089, Oct. 23-Nov. 1, 2013, pp. 1-7.
Sugimoto et al., "Signaling of Boundary Filtering Strength of Deblocking Filter for Intra", Joint Video Experts Team (JVET) of ITU-T SG 16 WP 3 and ISO/IEC JTC 1/SC 29/WG 11, JCTVC-F175, Jul. 14-22, 2011, pp. 1-6.
"Advanced Video Coding for Generic Audiovisual Services", Series H: Audiovisual and Multimedia Systems, Recommendation ITU-T H.264, Apr. 2017, 812 pages.
"High Efficiency Video Coding", Series H: Audiovisual and Multimedia Systems, Recommendation ITU-T H.265, Feb. 2018, 692 pages.
Auwera et al., "AHG6: Quantization Matrices and Deblocking Filtering", Joint Video Experts Team (JVET) of ITU-T SG 16 WP 3 and ISO/IEC JTC 1/SC 29/WG 11, JCTVC-I0280_r1, Apr. 27-May 7, 2012, pp. 1-10.
Sato "On Deblocking Filter and DC Component of Quantization Matrices", Joint Video Experts Team (JVET) of ITU-T SG 16 WP 3 and ISO/IEC JTC 1/SC 29/WG 11, JCTVC-J0186_r1, Jul. 11-20, 2012, pp. 1-6.

* cited by examiner

Fig. 10

| pic_parameter_set_rbsp( ) { | Descriptor |
|---|---|
| ... | |
| deblocking_filter_control_present_flag | u(1) |
| if(deblocking_filter_control_present_flag) { | |
| deblocking_filter_override_enabled_flag | u(1) |
| pps_deblocking_filter_disabled_flag | u(1) |
| if(!pps_deblocking_filter_disabled_flag) { | |
| pps_beta_offset0_div2 | se(v) |
| pps_tc_offset0_div2 | se(v) |
| pps_beta_offset1_div2 | se(v) |
| pps_tc_offset1_div2 | se(v) |
| deblocking_offset_component_use_flag | se(v) |
| if(!deblocking_offset_component_use_flag) | u(1) |
| pps_tc_beta_offset_switched_threshold | se(v) |
| } | |
| } | |
| ... | |

Fig. 11

| | Descriptor |
|---|---|
| slice_header( ) { | |
| ... | |
| if(deblocking_filter_override_enabled_flag) | |
| deblocking_filter_override_flag | u(1) |
| if(deblocking_filter_override_flag) { | |
| slice_deblocking_filter_disabled_flag | u(1) |
| if(!slice_deblocking_filter_disabled_flag) { | |
| slice_beta_offset0_div2 | se(v) |
| slice_tc_offset0_div2 | se(v) |
| slice_beta_offset1_div2 | se(v) |
| slice_tc_offset1_div2 | se(v) |
| if(deblocking_offset_component_use_flag) | |
| slice_deblocking_offset_switched_threshold | se(v) |
| } | |
| } | |
| ... | |

IMAGE PROCESSING DEVICE AND IMAGE PROCESSING METHOD

CROSS-REFERENCE TO RELATED APPLICATIONS

The present application is based on PCT filing PCT/JP2020/033468, filed Sep. 3, 2020, which claims priority to U.S. Provisional Application No. 62/897,038, filed Sep. 6, 2019, the entire contents of each are incorporated herein by reference.

TECHNICAL FIELD

The present technology relates to an image processing device and an image processing method, and more particularly to, for example, an image processing device and an image processing method capable of improving image quality.

BACKGROUND ART

JVET (Joint Video Experts Team), a joint standardization organization of ITU-T and ISO/TEC, is standardizing VVC (Versatile Video Coding) which is a next-generation image encoding method with the aim of further improving encoding efficiency as compared with H.265/HEVC.

Regarding tc and beta, which are filter parameters of DF (deblocking filter), a technique for setting one set of offset parameters slice_tc_offset_div2 and slice_beta_offset_div2 in slice units, respectively, is described in NPL 1 and NPL 2, for example.

According to the techniques described in NPL 1 and NPL 2, the filter parameters tc and beta can be adjusted by the offset parameters slice_tc_offset_div2 and slice_beta_offset_div2 in slice units, the DF can be controlled using the adjusted filter parameters, and the DF can be applied.

CITATION LIST

Non Patent Literature

[NPL 1] Benjamin Bross, Jianle Chen, Shan Liu, Versatile Video Coding (Draft 6), JVET-O2001-v14 (version 14, date 2019 Jul. 31)

[NPL 2] Jianle Chen, Yan Ye, Seung Hwan Kim, Algorithm description for Versatile Video Coding and Test Model 6 (VTM 6), JVET-O2002-v1 (version 1, date 2019 Aug. 15)

SUMMARY

Technical Problem

In the techniques described in NPL 1 and NFL 2, when a portion in the slice where it is desired to strengthen the DF filter strength to suppress block noise and a portion in the slice where it is desired to weaken the DF filter strength to keep the details of an original image to be encoded have different luminance components and different color difference components, it is difficult to adjust the filter strength between the luminance component and the color difference component. Therefore, it is difficult to improve the (subjective) image quality of the decoded image.

The present technology was made in view of such a situation, and enables the image quality to be improved.

Solution to Problem

A first image processing device of the present technology is an image processing device including a decoding unit that decodes a bitstream to generate a decoded image; and a filter unit that applies a deblocking filter to a color difference component of pixels near a block boundary of the decoded image generated by the decoding unit using a color difference offset parameter set used when applying a deblocking filter to the color difference component of the decoded image generated by the decoding unit.

A first image processing method of the present technology is an image processing method including an decoding step of decoding a bitstream to generate a decoded image; and a filtering step of applying a deblocking filter to a color difference component of pixels near a block boundary of the decoded image generated by the decoding step using a color difference offset parameter set used when applying a deblocking filter to the color difference component of the decoded image generated by the decoding step.

In the first image processing device and image processing method of the present technology, a bitstream is decoded to generate a decoded image. A deblocking filter is applied to the color difference component of the pixels near the block boundary of the decoded image using the color difference offset parameter set used when applying the deblocking filter to the color difference component of the decoded image.

A second image processing device of the pixel data is an image processing device including a setting unit, that sets a color difference offset parameter set used when applying a deblocking filter to a color difference component of a decoded image obtained by decoding a bitstream; and an encoding unit that encodes an image to generate a bitstream including the color difference offset parameter set set by the setting unit.

A second image processing method of the present technology is an image processing method including a setting step of setting a color difference offset parameter set used when applying a deblocking filter to a color difference component of a decoded image obtained by decoding a bitstream; and an encoding step of encoding an image to generate a bitstream including the color difference offset parameter set set by the setting step.

In the second image processing device and image processing method of the present technology, a color difference offset parameter set used when applying a deblocking filter to the color difference component of the decoded image obtained by decoding the bitstream is set. The image is encoded to generate a bitstream including the color difference offset parameter set.

The image processing device may be an independent device or an internal block constituting one device.

The image processing device can be realized by causing a computer to execute a program. The program can be provided by transmitting via a transmission medium or by recording on a recording medium.

BRIEF DESCRIPTION OF DRAWINGS

FIG. 10 is a diagram showing an example of the syntax of a picture parameter set when two sets of offset parameter sets are included in the picture parameter set.

FIG. 11 is a diagram showing an example of the syntax of a slice header when two sets of offset parameter sets are included in the slice header.

DESCRIPTION OF EMBODIMENTS

Figure 1:
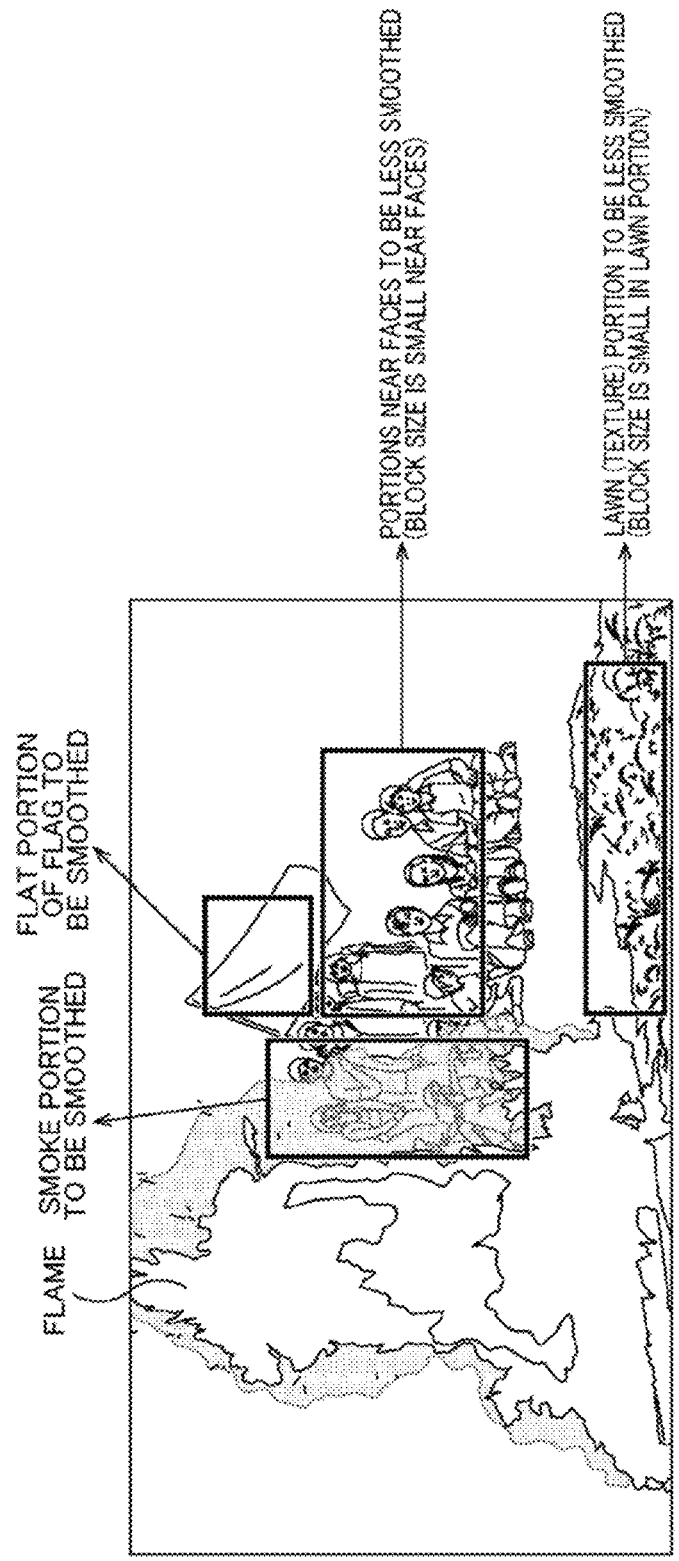
FIG. 1 is a diagram showing an example of a picture as an image (original image) to be encoded.

The scope disclosed in the present specification is not limited to the content of the embodiments. The disclosures in the following reference documents REF1 to REF6, which have been publicly known at the time of filing of the present application, are also incorporated into the present specification by reference. In other words, the disclosures in the following reference documents REF1 to REF6 also serve as the grounds for determination on the support requirements. For example, even if Quad-Tree Block Structure, QTBT (Quad Tree Plus Binary Tree) Block Structure, and MTT (Multi-type Tree) Block Structure are not directly defined in the detailed description of the invention, the structures are considered to be included within the scope of the present disclosure and to satisfy the support requirements of the claims. For example, the same applies to the technical terms such as Parsing, Syntax, and Semantics. Even if these technical terms are not directly defined in the detailed description of the invention, the technical terms are considered to be included within the scope of the present disclosure and to satisfy the support requirements of the claims. Similarly, the same applies to the technical terms such as Deblocking Filter and Offset Parameter (tc, beta). Even if these technical terms are not directly defined in the detailed description of the invention, the technical terms are considered to be included within the scope of the present disclosure and to satisfy the support requirements of the claims.

REF1: Recommendation ITU-T H.264 (April 2017)|Advanced video coding for generic audiovisual services", April 2017

REF2: Recommendation ITU-T H.265 (February 2018) High efficiency video coding", February 2018

REF3: Benjamin Bross, Jianle Chen, Shan Liu, Versatile Video Coding (Draft 6), JVET-O2001-v14 (version 14, date 2019 Jul. 31)

REF4: Jianle Chen, Yan Ye, Seung Hwan Kim, Algorithm description for Versatile Video Coding and Test Model 6 (WM 6), JVET-O2002-v1 (version 1, date 2019 Aug. 15)

REF5: Geert Van der Auwera, Rajan Joshi, Marta Karczewicz AHG6: Quantization Matrices and Deblocking Filtering, JCTVC-I0280_r1, (version 2, 2012 Apr. 25)

REF6: Kazushi Sato: Title: On Deblocking Filter and DC Component of Quantization Matrices, JCTVC-J0186_r1 (version 2-data-2012 Jul. 11)

<Definition>

In the present disclosure, the following terms are defined as follows.

An original image means the original image before encoding.

A decoded image means an image generated in the decoding process. The decoded image includes an image generated in the middle of the decoding process and an image output after the decoding process is performed.

A locally decoded image means an image generated in the local decoding when encoding the image, and includes an image generated in the middle of the local decoding and an image output after the local decoding. Hereinafter, the locally decoded image is also simply referred to as a decoded image.

An encoded data means the data after an image (texture) is encoded.

A bitstream (or encoded bitstream, or encoded stream) means data including encoded data as well as data in which parameters required for encoding or decoding are encoded.

A parameter (encoded parameter) is a general term for data required for encoding or decoding, and is typically the syntax, a parameter set, or the like of the bitstream. The parameter (encoded parameter) includes variables and the like used in the derivation process.

The filter parameter is a parameter used when controlling the filter. For example, for the deblocking tc and beta described in REF3/REF4 correspond to the filter parameter.

The offset parameter is an offset that adjusts the filter parameter used when controlling the filter. For example, for the deblocking filter, tc_offset and beta_offset described in REF3/REF4 correspond to the offset parameter.

The offset parameter set means a set (group) of offset parameters, and corresponds to, for example, a set of (tc_offset, beta_offset).

A plurality of offset parameter sets corresponds to (tc_offset0, beta_offset0), (tc_offset1, beta_offset1), . . . , (tc_offset#N, beta_offset#N). For example, two sets of offset parameters correspond to (tc_offset0, beta_offset0) and (tc_offset1, beta_offset1).

The block means a block (a group of pixels (values)) that is a processing unit when performing an encoding process.

The prediction block means a block that is a processing unit when performing intra-prediction or inter-prediction, and includes sub-blocks in the prediction block.

When the prediction block is unified with a processing unit such as an orthogonal transform block which is a processing unit when performing orthogonal transform and an encoding block which is a processing unit when performing an encoding process, the prediction block (for example, PU), orthogonal transform block (for example, TU), and encoded block (for example, CU) mean the same block.

The block boundary means the boundary of blocks.

A pixel located near the block boundary means a pixel located within the range in which the deblocking filter is applied to the block boundary.

In the present disclosure, identification data that identifies a plurality of patterns can be set as the syntax of a bitstream. In this case, the decoder can perform processing more efficiently by parsing and referencing the identification data.

<Example of Original Image>

FIG. 1 is a diagram showing an example of a picture as an image (original image) to be encoded.

Various subjects are captured in the picture. The picture in FIG. 1 shows the flames and smoke of a bonfire, people, flags, lawns, and the like that make up one scene of a campfire.

In the decoded image obtained b encoding and decoding a picture in which various subjects are captured, a portion where the block boundary is conspicuous and a portion where the block boundary is not so conspicuous are mixed depending on the characteristics of the subject captured in the block, the block size, and the like.

From the viewpoint of improving the image quality of the decoded image, it is desirable that a DF with relatively strong filter strength (degree of smoothing) is applied to the portion where the block boundary is conspicuous, and a DF with relatively weak filter strength is applied to the portion where the block boundary is not so conspicuous.

Therefore, in the decoded image, a portion to which the DF having relatively strong filter strength is desired to be applied and a portion to which the DF having weak filter strength is desired to be applied are mixed.

For example, in FIG. 1, the portion where smoke is captured and a flat portion where a flag is captured correspond to a portion to which DF having strong filter strength is desired to be applied.

On the other hand, the portion where the face of a person is captured and the texture portion where the lawn is captured correspond to the portion where the block size is likely to be set small and the DF having weak filter strength is desired to be applied.

In general, the larger the quantization parameter, the larger the block size of the (encoded) block tends to be. For blocks with a large block size, the block boundary of two adjacent blocks is easily noticeable, and there is a need to apply the DF.

In VVC, a long-tap filter with strong filter strength is adopted as one of the DFs. A long-tap filter is applied to a block having a large block size of 32 or more luminance component pixels and 8 or more color difference component pixels when the condition for applying the long-tap filter is satisfied. Therefore, there is a potential need to apply a DF with strong filter strength to a block with a large block size.

In order to improve the (subjective) image quality, for example, it is conceivable to set the offset parameter of the DF to which the long-tap filter is positively applied.

However, the offset, parameters are reflected in the DF filter parameters tc and beta in slice units. Therefore, if a block with a relatively small block size is present in the slice that it is not desired to actively apply the DF in addition to the block with a large block size, the DF likely to be applied to the block with a small block size as well as the block with a large block size. In this case, the decoded image is blurred, and it becomes difficult to improve the image quality.

On the other hand, when the offset parameter is not applied, it becomes difficult to apply the DP to the block having a large block size in the slice, and the block noise becomes conspicuous.

<Relationship Between Quantization Step Size and Filter Parameters tc and Beta>

Figure 2:
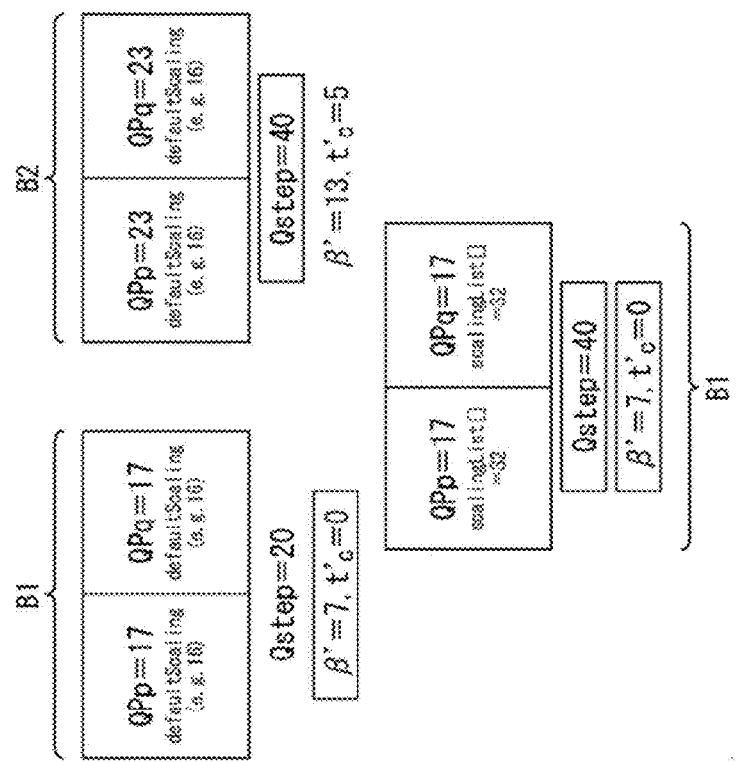
FIG. 2 is a diagram illustrating the relationship between the quantization step size and the filter parameters tc and beta of DF.

FIG. 2 is a diagram illustrating the relationship between the quantization step size and the filter parameters tc and beta of DF.

When applying a quantization matrix in image encoding, the quantization step size is adjusted. The DF filter parameters tc and beta of the VVC are derived on the basis of the average $((QP_p+QP_q+1)>>1)$ of the quantization parameters $QP_p$ and $QP_q$ of two adjacent blocks. Therefore, the adjustment of the quantization step size by the quantization matrix is not reflected in the filter parameters tc and beta.

FIG. 2 shows adjacent blocks B1 which are two adjacent blocks in which the base QP ($QP_p$ and $QP_q$) is 17, the scalingList[ ] corresponding to the quantization matrix is, for example, 16 as the defaultScaling, and the quantization step size Qstep is 20.

Further, FIG. 2 shows adjacent blocks B2 which are two adjacent blocks in which the base QP is 23, the scalingList[ ] corresponding to the quantization matrix is 16 as the defaultScaling, and the quantization step size Qstep is 40.

In FIG. 2, the filter parameters tc and beta ($t'_c$ and $\beta'$) of the DF applied to the block boundary (pixels in the vicinity of) of the adjacent blocks B1 are 0 and 7, respectively. The DF filter parameters tc and beta applied to the block boundary of adjacent blocks B2 are 5 and 13, respectively.

Now, if the scalingList[ ] corresponding to the quantization matrix is changed from 16 to 32 as the defaultScaling for the adjacent blocks B1, the quantization step size Qstep is adjusted to 40, which is the same as that of the adjacent blocks B2.

However, the filter parameters tc and beta applied to the block boundary of the adjacent blocks B1 after the quantization step size Qstep is adjusted to 40 remain 0 and 7, respectively.

As described above, in the cases of the base QP=23 && default scaling list (scalingList[ ]=16) and the base QP=17 && scalingList[ ]=32, the quantization step size is the same, but the derived DF filter parameters may be significantly different.

That is, for the adjacent blocks B1 with the base QP of 17 and the scaling-List[ ] of 32 and the adjacent blocks B2 with the base QP of 23 and the scalingList[ ] of 16 as defaultScaling, the quantization step sizes Qstep are both the same 40.

However, the filter parameters to and beta of the DF applied to the block boundary of the adjacent blocks B1 with the base QP of 17 and the scalingList[ ] of 32 are 0 and 7, respectively. The DF filter parameters tc and beta applied to the block boundary of the adjacent blocks B2 with the base QP of 23 and the scalingList[ ] of 16 as defaultScaling are 5 and 13, respectively. Therefore, the filter parameters to and beta of DF are significantly different in the adjacent blocks B1 and B2 having the same quantization step size Qstep of 40.

References REF5 and REF6 propose techniques for adjusting the quantization parameters, but they are not adopted because of the increased complexity of processing. A simple solving method is desired for the problem that the adjustment of the quantization step size by the quantization matrix is not reflected in the filter parameters tc and beta.

The filter parameters tc and beta can be adjusted with the offset parameters. Considering the tendency that the DF is desired to be applied to a large block, it is demanded that the adjustment of the filter parameters to and beta in the offset parameter is to be made only to large blocks (blocks with a large block size).

When the current one set of offset parameters is applied uniformly to slices, the DF (DF with strong filter strength) is strongly applied to relatively small blocks (blocks with a small block size) and the image may be blurred.

On the other hand, if the offset parameter is not applied, block noise will be noticeable in a large block.

Therefore, with the current, one set of offset parameters, that is, with only one set (offset parameter set) of the offset parameter for adjusting the filter parameter tc and the offset parameter for adjusting the filter parameter beta, it may be difficult to improve the image quality as a whole in a slice where a large block and a small block are mixed.

Therefore, in the present technology, when adjusting the filter parameters tc and beta of the DF, a plurality of sets of offset parameter sets can be set in the processing unit (filter processing unit) (hereinafter, also referred to as an adjustment unit) for which the filter parameters tc and beta are to be adjusted. The set plurality of sets of offset parameter sets can be set as the syntax of the bitstream in which the image is encoded.

As the adjustment unit for adjusting the adjustment of the filter parameters to and beta by a plurality of sets of offset parameter sets, for example, a picture unit or a slice unit can be adopted.

When a picture unit is adopted as the adjustment unit, a plurality of sets of offset parameter sets can be set in the picture parameter set or the picture header.

When a slice unit is adopted as the adjustment unit, a plurality of sets of offset parameter sets can be set in the slice header.

When the picture unit is adopted as the adjustment unit, a plurality of sets of offset parameter sets can be set in both the picture parameter set and the slice. When a plurality of sets of offset parameter sets is set for both the picture parameter set and the slice, if the offset parameters of the picture parameter set and the slice are different, the plurality of sets of offset parameter sets set in the picture parameter set can be preferentially used for adjusting the filter parameters tc and beta.

As the number of sets of offset parameter sets set in the adjustment unit, an arbitrary plurality of sets such as 2 sets, 3 sets, 4 sets or more can be adopted. When two sets of offset parameter sets are used as the number of sets of offset parameter sets to be set in the adjustment unit, the processing can be simplified and the size of the offset parameter sets can be reduced.

From a plurality of sets of offset parameter sets, the current offset parameter set, that is, the offset parameter used fur the block boundary to which the DF is applied can be selected according to the encoding parameter.

When the current offset parameter set is selected according to the encoding parameter, a threshold for the encoding parameter can be set as a selection criterion for selecting the current offset parameter set according to the encoding parameter.

As the encoding parameter used in selecting the current offset parameter set, for example, the block size can be adopted.

In this case, for example, a first offset parameter set used to adjust the filter parameters tc and beta of the DF applied to the block boundary of blocks whose block size is equal to or greater than the threshold, and a second offset parameter set used to adjust the filter parameters tc and beta of the DF applied to the block boundary of blocks whose block size is not equal to or greater than the threshold can be set.

For blocks whose block size is equal to or larger than the threshold, the first offset parameter set can be selected as the current offset parameter set. For blocks whose block size is not equal to or greater than the threshold, the second offset parameter set can be selected as the current offset parameter set.

The first offset parameter set, the second offset parameter set, and the threshold of the block size can be set in the syntax of the bitstream.

As the plurality of sets of offset parameter sets, for example, offset parameter sets for each of the luminance component and the color difference component of the decoded image can be set.

When there is a plurality of color difference components, one set of offset parameter sets can be set collectively for the plurality of color difference components, or one set of offset parameter sets can be set individually for each of the plurality of color difference components.

When setting an offset parameter set for each of the luminance component and the color difference component of the decoded image, if one set of offset parameter sets is set for each of the plurality of color difference components, one set of offset parameter sets is set for each component of the decoded image.

For example, when the decoded image has the components of YCbCr (when the color space for the decoded image is YCbCr), one set of offset parameter sets can be set for each component of YCbCr, that is, each of the luminance component Y, the color difference component Cb (Cb component), and the color difference component Cr (Cr component). In this case, three sets of offset parameter sets are set.

Further, for example, when the decoded image has the components of YUV (when the color space for the decoded image is YUV), one set of offset parameter sets can be set for each component of YUV, that is, each of the luminance component Y, the color difference component U (U component), and the color difference component V (V component). In this case, three sets of offset parameter sets are set.

When two sets of offset parameter sets are set in total, one set of offset parameter sets for the luminance component and one set of offset parameter sets for the color difference component, in the application of DF, the offset parameter set for the luminance component is used as the current offset parameter set for the luminance component from the two sets of offset parameter sets, and the offset parameter set for the color difference component is used as the current offset parameter set for the color difference component.

When three sets of offset parameter sets are set in total, one set of offset parameter sets (luminance offset parameter sets) for the luminance component Y, one set of offset parameter sets (first color difference offset parameter sets) for the color difference component (the first color difference component) Cb or U, and one set of offset parameter sets (second color difference offset parameter sets) for the color difference component (the second color difference component) Cr or V, in the application of DF, the offset parameter set for the luminance component used as the current offset parameter set for the luminance component Y from the three sets of offset parameter sets. The offset parameter set for the color difference component Cb or U is used as the current offset parameter set for the color difference component Cb or U, and the offset parameter set for the color difference component Cr or V is used as the current offset parameter set for the color difference component Cr or V.

In the application of DF, when two sets of offset parameter sets are used in total, one set of offset parameter sets for the luminance component and one set of offset parameter sets for the color difference component, and when a portion where it is desired to strengthen the DF filter strength to suppress the block noise and a portion where it is desired to weaken the DF filter strength to keep the details of an original image to be encoded have different luminance components and different color difference components, it is possible to adjust the filter strength between the luminance component and the color difference component and improve the image quality of the decoded image.

In the application of DF, when three sets of offset parameter sets are used in total, one set of offset parameter sets for the luminance component Y, one set of offset parameter sets for the color difference component Cb or U, and one set of offset parameter sets for the color difference component Cr or V, and when a portion where it is desired to strengthen the DF filter strength to suppress the block noise and a portion where it is desired to weaken the DF filter strength to keep the details of an original image to be encoded have different luminance components and different color difference components, it is possible to adjust the filter strength between the components and improve the image quality of the decoded image.

<Image Processing System to which Present Technology is Applied>

Figure 3:
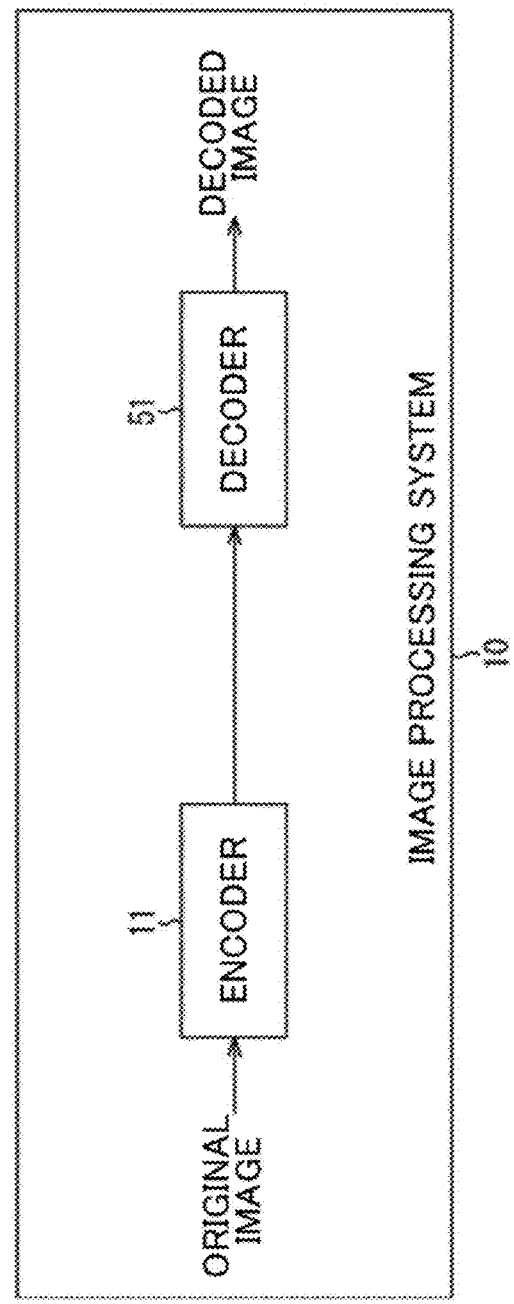
FIG. 3 is a block diagram showing a configuration example of an embodiment of an image processing system to which the present technology is applied.

FIG. 3 is a block diagram showing a configuration example of an embodiment of an image processing system to which the present technology is applied.

An image processing system 10 has an image processing device as an encoder 11 and an image processing device as a decoder 51.

The encoder 11 encodes the original image to be encoded supplied thereto and outputs an encoded bitstream obtained by the encoding. The encoded bitstream is supplied to the decoder 51 via a recording medium or a transmission medium (not shown).

The decoder 51 decodes the encoded bitstream supplied thereto, and outputs a decoded image obtained by the decoding.

<Configuration Example of Encoder 11>

Figure 4:
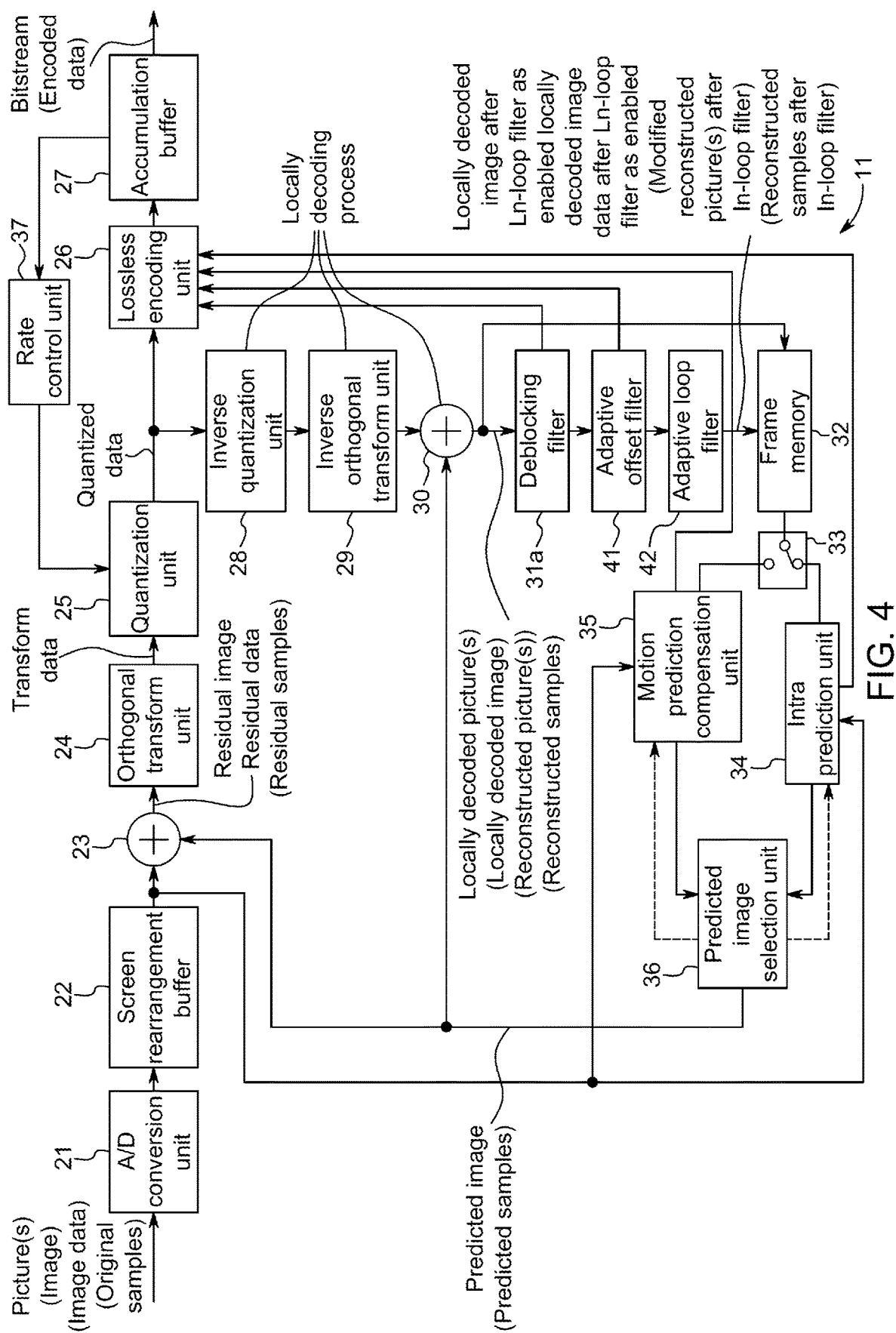
FIG. 4 is a block diagram showing a detailed configuration example of an encoder 11.

FIG. 4 is a block diagram showing a detailed configuration example of the encoder 11 of FIG. 3.

In the block diagram described below, the description of the line that supplies the information (data) required for the processing of each block is omitted as appropriate in order to avoid the complication of the diagram.

In FIG. 4, the encoder 11 has an A/D conversion unit 21, a screen rearrangement buffer 22, a calculation unit 23, an orthogonal transform unit 24, a quantization unit 25, a lossless encoding unit 26, and an accumulation buffer 27. The encoder 11 includes an inverse quantization unit 28, an inverse orthogonal transform unit 29, a calculation unit 30, a frame memory 32, a selection unit 33, an intra-prediction unit 34, a motion prediction/compensation unit 35, a predicted image selection unit 36, and a rate control unit 37. The encoder 11 has a DF 31a, an adaptive offset filter 41, and an ALF (adaptive loop filter) 42.

The A/D conversion unit 21 A/D-converts the original image (encoding target) of the analog signal into the original image of the digital signal, supplies the same to the screen rearrangement buffer 22, and stores the same therein. When the original image of the digital signal is supplied to the encoder 11, the encoder 11 can be configured without providing the A/D conversion unit 21.

The screen rearrangement buffer 22 rearranges the frames of the original image in the order of encoding (decoding) from the display order according to the GOP (Group Of Picture), and supplies the original image to the calculation unit 23, the intra-prediction unit 34, and the motion prediction/compensation unit 35.

The calculation unit 23 subtracts the predicted image supplied from the intra-prediction unit 34 or the motion prediction/compensation unit 35 via the predicted image selection unit 36 from the original image from the screen rearrangement buffer 22, and supplies the residue (predicted residue) obtained by the subtraction to the orthogonal transform unit 24.

The orthogonal transform unit 24 performs orthogonal transform such as discrete cosine transform and Karhunen-Loeve transform on the residue supplied from the calculation unit 23, and supplies the orthogonal transform coefficient obtained by the orthogonal transform to the quantization unit 25.

The quantization unit 25 quantizes the orthogonal transform coefficient supplied from the orthogonal transform unit 24. The quantization unit 25 sets the quantization parameter on the basis of the target value (target code amount value) of the code amount supplied from the rate control unit 37, and performs the quantization of the orthogonal transform coefficient. The quantization unit 25 supplies the encoded data, which is the quantized orthogonal transform coefficient, to the lossless encoding unit 26.

The lossless encoding unit 26 encodes the quantized orthogonal transform coefficient as the encoded data from the quantization unit 25 by a predetermined lossless encoding method.

The lossless encoding unit 26 acquires the encoding information necessary for decoding by a decoding device 170 from each block among the encoding information related to the predictive encoding by the encoder 11.

Here, examples of the encoding information include a prediction mode of intra-prediction or inter-prediction, motion information such as motion vector, a target code amount value, a quantization parameter, a picture type (I, P, B), and encoding parameters such as filter parameters of the DF 31a and the adaptive offset filter 41.

The prediction mode can be acquired from the intra-prediction unit 34 and the motion prediction/compensation unit 35. The motion information can be acquired from the motion prediction/compensation unit 35. The filter parameters of the DIF 31a and the adaptive offset filter 41 can be acquired from the DF 31a and the adaptive offset filter 41, respectively.

The lossless encoding unit 26 encodes the encoding information by a variable-length encoding or arithmetic encoding method such as CAVLC (Context-Adaptive Variable Length Coding) or CABAC (Context-Adaptive Binary Arithmetic Coding), and other lossless encoding method to generate encoded bitstream including (multiplexing) the encoded encoding information and the encoded data from the quantization unit 25, and supplies the encoded bitstream to the accumulation buffer 27.

The accumulation buffer 27 temporarily accumulates the encoded bitstream supplied from the lossless encoding unit 26. The encoded bitstream accumulated in the accumulation buffer 27 is read out and transmitted at a predetermined timing.

The encoded data, which is the orthogonal transform coefficient quantized in the quantization unit 25, is supplied to the inverse quantization unit 28 as well as the lossless encoding unit 26. The inverse quantization unit 28 performs inverse quantization on the quantized orthogonal transform coefficient by a method corresponding to the quantization by the quantization unit 25, and supplies the orthogonal transform coefficient obtained by the inverse quantization to the inverse orthogonal transform unit 29.

The inverse orthogonal transform unit 29 performs inverse orthogonal transform on the orthogonal transform coefficient supplied from the inverse quantization unit 28 by a method corresponding to the orthogonal transform process by the orthogonal transform unit 24, and supplies the residue obtained as a result of the inverse orthogonal transform to the calculation unit 30.

The calculation unit 30 adds the predicted image supplied from the intra-prediction unit 34 or the motion prediction compensation unit 35 via the predicted image selection unit 36 to the residue supplied from the inverse orthogonal transform unit 29 to thereby obtain and output (a part of) a decoded image obtained by decoding the original image.

The decoded image output by the calculation unit 30 is supplied to the DF 31a or the frame memory 32.

The frame memory 32 temporarily stores the decoded image supplied from the calculation unit 30 and the decoded image (filter image) which is supplied from the ALF 42 and to which the DF 31a, the adaptive offset filter 41, and the ALF 42 are applied. The decoded image stored in the frame memory 32 is supplied to the selection unit 33 as a reference image used for generating the predicted image at a necessary timing.

The selection unit 33 selects the supply destination of the reference image supplied from the frame memory 32. When the intra-prediction unit 34 performs the intra-prediction, the selection unit 33 supplies the reference image supplied from the frame memory 32 to the intra-prediction unit 34. When the motion prediction/compensation unit 35 performs inter-prediction, the selection unit 33 supplies the reference image supplied from the frame memory 32 to the motion prediction/compensation unit 35.

The intra-prediction unit 34 performs intra-prediction (in-screen prediction) using the original image supplied from the screen rearrangement buffer 22 and the reference image supplied from the frame memory 32 via the selection unit 33. The intra-prediction unit 34 selects the optimum intra-prediction mode on the basis of a predetermined cost function (for example, RD cost, and the like), and supplies the predicted image generated from the reference image in the optimum intra-prediction mode to the predicted image selection unit 36. Further, as described above, the intra-prediction unit 34 appropriately supplies a prediction mode indicating the intra-prediction mode selected on the basis of the cost function to the lossless encoding unit 26 and the like.

The motion prediction/compensation unit 35 performs motion prediction (inter-prediction) using the original image supplied from the screen rearrangement buffer 22 and the reference image supplied from the frame memory 32 via the selection unit 33. The motion prediction/compensation unit 35 performs motion compensation according to the motion vector detected by the motion prediction, and generates a predicted image. The motion prediction/compensation unit 35 performs inter-prediction in a plurality of inter-prediction modes prepared in advance, and generates a predicted image from the reference image.

The motion prediction/compensation unit 35 selects the optimum inter-prediction mode on the basis of a predetermined cost function of the predicted image obtained for each of the plurality of inter-prediction modes. The motion prediction/compensation unit 35 supplies the predicted image generated in the optimum inter-prediction mode to the predicted image selection unit 36.

The motion prediction/compensation unit 35 supplies a prediction mode indicating an inter-prediction mode selected on the basis of the cost function and motion information such as a motion vector required for decoding the encoded data encoded in the inter-prediction mode to the lossless encoding unit 26.

The predicted image selection unit 36 selects the supply source of the predicted image to be supplied to the calculation unit 23 and the calculation wilt 30 from the intra-prediction unit 34 and the motion prediction/compensation unit 35 and supplies the predicted image supplied from the selected supply source to the calculation unit 23 and the calculation unit 30.

The rate control unit 37 controls the rate of the quantization operation of the quantization unit 25 on the basis of the code amount of the encoded bitstream accumulated in the accumulation buffer 27 so that overflow or underflow does not occur. That is, the rate control unit 37 sets a target code amount of the encoded bitstream and supplies the same to the quantization unit 25 so that overflow and underflow of the accumulation buffer 27 do not occur.

The DF 31a applies the DF to the decoded image from the calculation unit 30 as necessary, and supplies the decoded image (filter image) to which the DF is applied or the decoded image to which the DF is not applied to the adaptive offset filter 41.

The adaptive offset filter 41 applies an adaptive offset filter to the decoded image from the DF 31a as necessary, and supplies the decoded image (filter image) to which the adaptive offset filter is applied, or the decoded image to which the adaptive offset filter is not applied to the ALF 42.

The ALF 42 applies ALF to the decoded image from the adaptive, offset filter 41 as necessary, and supplies, the decoded image to which ALF is applied or the decoded image to which ALF is not applied to the frame memory 32.

In the encoder 11 configured as described above, the calculation unit 23, the orthogonal transform unit 24, the quantization unit 25, and the lossless encoding unit 26 function as an encoding unit that encodes the image using the filter image to generate an encoded bitstream.

<Encoding Process>

Figure 5:
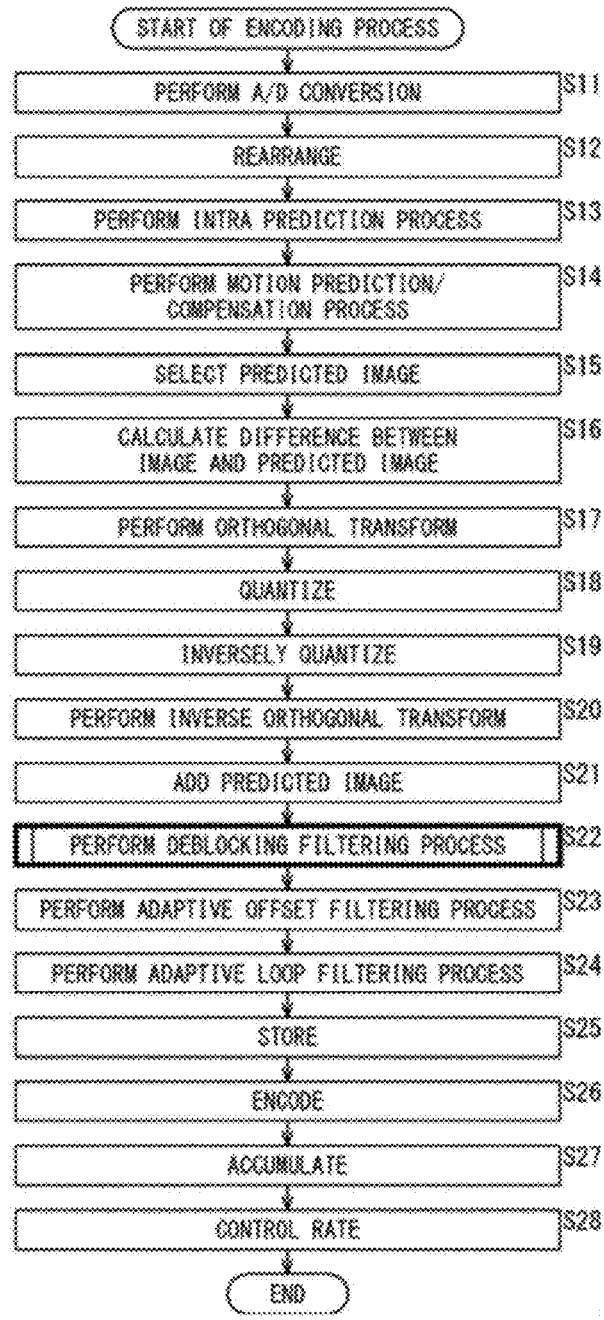
FIG. 5 is a flowchart illustrating an example of an encoding process of the encoder 11.

FIG. 5 is a flowchart illustrating an example of the encoding process of the encoder 11 of FIG. 4.

The order of the steps of the encoding process shown in FIG. 5 is an order for convenience of explanation, and the steps of the actual encoding process are performed in a necessary order in parallel as appropriate. This also applies to the processing described later.

In the encoder 11, in step S11, the A/D conversion unit 21 A/D-converts the original image and supplies the same to the screen rearrangement buffer 22, and the process proceeds to step S12.

In step S12, the screen rearrangement buffer 22 accumulates the original images from the A/D conversion unit 21 and rearranges and outputs them in the encoding order, and the process proceeds to step S15.

In step S13, the intra-prediction unit 34 performs the intra-prediction process in the intra-prediction mode, and the process proceeds to step S14. In step S14, the motion prediction/compensation unit 35 performs an inter-motion prediction process for performing motion prediction and motion compensation in the inter-prediction mode, and the process proceeds to step S15.

In the intra-prediction process of the intra-prediction unit 34 and the inter-motion prediction process of the motion prediction/compensation unit 35, the cost functions of various prediction modes are calculated and predicted images are generated.

In step S15, the predicted image selection unit 36 determines the optimum prediction mode on the basis of the cost functions obtained by the intra-prediction unit 34 and the motion prediction/compensation unit 35. The predicted image selection unit 36 selects and outputs the predicted image generated by the infra-prediction unit 34 and the predicted image in the optimum prediction mode among the predicted images generated by the motion prediction/compensation unit 35, and the process proceeds from step S15 to step S16.

In step S16, the calculation unit 23 calculates the residue between the target image to be encoded, which is the original image output by the screen rearrangement buffer 22, and the predicted image output by the predicted image selection unit 36, and supplies the residue to the orthogonal transform unit 24, and the process proceeds to step S17.

In step S17, the orthogonal transform unit 24 orthogonally transforms the residue from the calculation unit 23, supplies the resulting orthogonal transform coefficient to the quantization unit 25, and the process proceeds to step S18.

In step S18, the quantization unit 25 quantizes the orthogonal transform coefficient from the orthogonal transform unit 24, and supplies the quantization coefficient obtained by the quantization to the lossless encoding unit 26 and the inverse quantization unit 28, and the process proceeds to step S19.

In step S19, the inverse quantization unit 28 inversely quantizes the quantization coefficient from the quantization unit 25, supplies the resulting orthogonal transform coefficient to the inverse orthogonal transform unit 29, and the process proceeds to step S20. In step S20, the inverse orthogonal transform unit 29 performs inverse orthogonal transform on the orthogonal transform coefficient from the inverse quantization unit 28, supplies the resulting residue to the calculation unit 30, and the process proceeds to step S21.

In step S21, the calculation unit 30 adds the residue from the inverse orthogonal transform unit 29 and the predicted image output by the predicted image selection unit 36, and generates a decoded image corresponding to the original image which is the target of the calculation of the residue in the calculation unit 23. The calculation unit 30 supplies the decoded image to the DF 31a, and the process proceeds from step S21 to step S22.

In step S22, the DF 31a applies the DF to the decoded image from the calculation unit 30, and supplies the resulting filter image to the adaptive offset filter 41, and the process proceeds to step S23.

In step S23, the adaptive offset filter 41 applies the adaptive offset filter to the filter image from the DF 31a, and supplies the resulting filter image to the ALF 42, and the process proceeds to step S24.

In step S24, the ALF 42 applies the ALF to the filter image from the adaptive offset filter 41, and supplies the resulting filter image to the frame memory 32, and the process proceeds to step S25.

In step S25, the frame memory 32 stores the filter image supplied from the ALF 42, and the process proceeds, to step S26. The filter image stored in the frame memory 32 is used as a reference image which is the source from which the predicted image is generated in steps S13 and S14.

In step S26, the lossless encoding unit 26 encodes the encoded data which is the quantization coefficient from the quantization unit 25 and generates an encoded bitstream including the encoded data. The lossless encoding unit 26 encodes the quantization parameters used for the quantization in the quantization unit 25, the prediction mode obtained by the intra-prediction process in the intra-prediction unit 34, the prediction mode and the motion information obtained in the inter-motion prediction process in the motion prediction/compensation unit 35, and the encoding information such as the filter parameters of the DF 31a and the adaptive offset filter 41 as necessary and includes the same in the encoded bitstream.

The lossless encoding unit 26 supplies the encoded bitstream to the accumulation buffer 27, and the process proceeds from step S26 to step S27.

In step S27, the accumulation buffer 27 accumulates the encoded bitstream from the lossless encoding unit 26, and the process proceeds to step S28. The encoded bitstream accumulated in the accumulation buffer 27 is appropriately read out and transmitted.

In step S28, the rate control unit 37 controls the rate of the quantization operation of the quantization unit 25 on the basis of the code amount (occurrence code amount) of the encoded bitstream accumulated in the accumulation buffer 27 so that overflow or underflow does not occur, and the encoding process ends.

<Configuration Example of Decoder 51>

Figure 6:
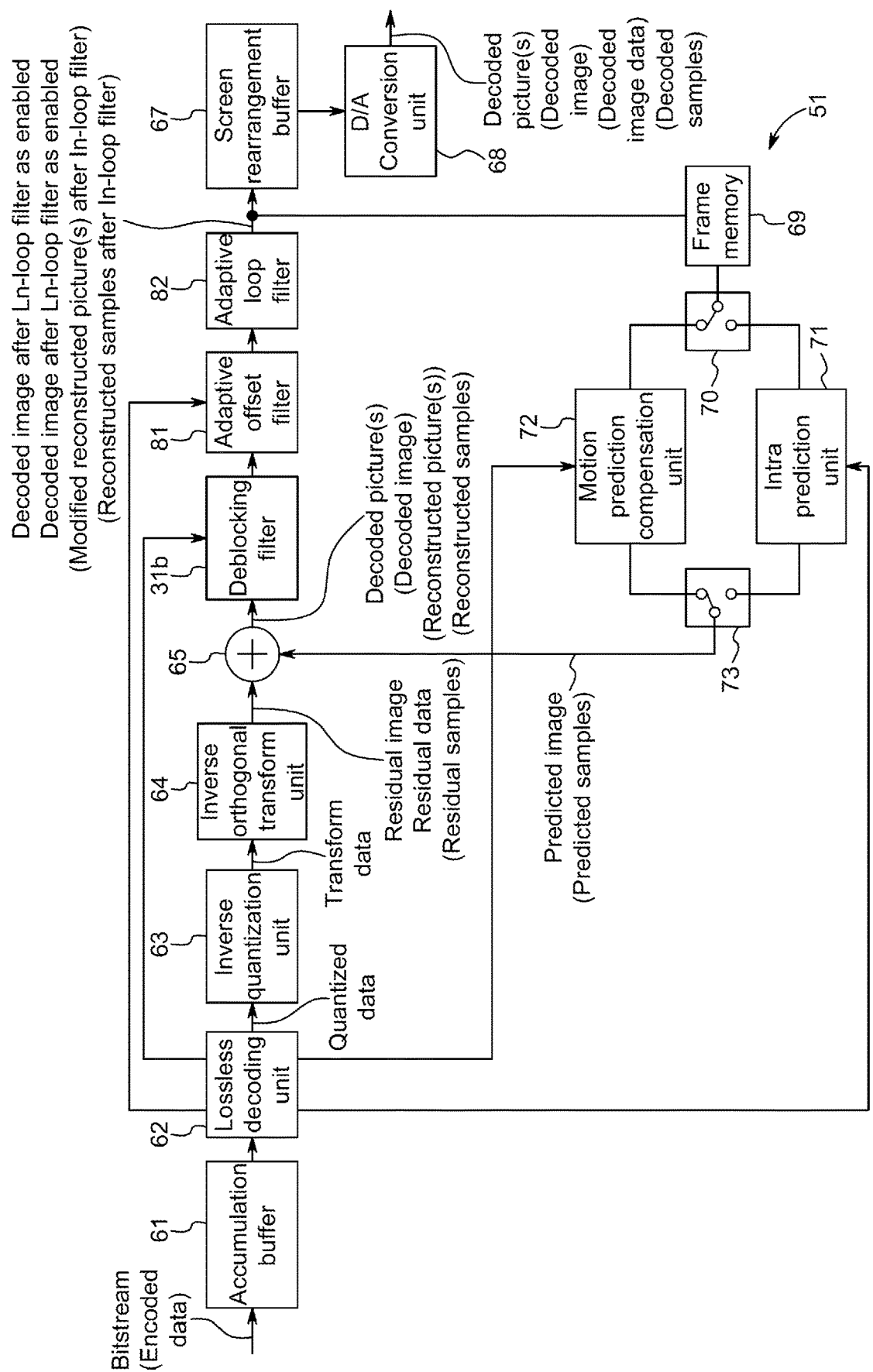
FIG. 6 is a block diagram showing a detailed configuration example of a decoder 51.

FIG. 6 is a block diagram showing a detailed configuration example of the decoder 51 of FIG. 3.

In FIG. 6, the decoder 51 includes an accumulation buffer 61, a lossless decoding unit 62, an inverse quantization unit 63, an inverse orthogonal transform unit 64, a calculation unit 65, a screen rearrangement buffer 67, and a D/A conversion unit 68. The decoder 51 includes a frame memory 69, a selection unit 70, an intra-prediction unit 71, a motion prediction/compensation unit 72, and a selection unit 73. The decoder 51 has a DF 31b, an adaptive offset filter 81, and an ALF 82.

The accumulation buffer 61 temporarily accumulates the encoded bitstream transmitted from the encoder 11 and supplies the encoded bitstream to the lossless decoding unit 62 at a predetermined timing.

The lossless decoding unit 62 receives the encoded bitstream from the accumulation buffer 61 and decodes the same by a method corresponding to the encoding method of the lossless encoding unit 26 of FIG. 4.

The lossless decoding unit 62 supplies the quantization coefficient as the encoded data included in the decoding result of the encoded bitstream to the inverse quantization unit 63.

The lossless decoding unit 62 has a function of performing parsing. The lossless decoding unit 62 parses the necessary encoding information included in the decoding result of the encoded bitstream, and supplies the encoding information to the intra-prediction unit 71, the motion prediction/compensation unit 72, the DF 31b, the adaptive offset filter 81, and other necessary blocks.

The inverse quantization unit 63 inversely quantizes the quantization coefficient as the encoded data from the lossless decoding unit 62 by a method corresponding to the quantization method of the quantization unit 25 in FIG. 4, and supplies the orthogonal transform coefficient obtained by the inverse quantization to the inverse orthogonal transform unit 64.

The inverse orthogonal transform unit 64 performs inverse orthogonal transform on the orthogonal transform coefficient supplied from the inverse quantization unit 63 by a method corresponding to the orthogonal transform method of the orthogonal transform unit 24 of FIG. 4, and supplies the resulting residue to the calculation unit 65.

The calculation unit 65 is supplied with the residue from the inverse orthogonal transform unit 64 as well as the predicted image from the intra-prediction unit 71 or the motion prediction/compensation unit 72 via the selection unit 73.

The calculation unit 65 adds the residue from the inverse orthogonal transform unit 64 and the predicted image from the selection unit 73 to generate a decoded image and supplies the same to the DF 31b.

The screen rearrangement buffer 67 temporarily stores the decoded images supplied from the ALF 82, rearranges the arrangement of the frames (pictures) of the decoded images from the order of encoding (decoding) to the display order, and supplies the same to the D/A conversion unit 68.

The D/A conversion unit 68 D/A-converts the decoded image supplied from the screen rearrangement buffer 67 and outputs the same to a display (not shown) for display. When a device connected to the decoder 51 receives an image of a digital signal, the decoder 51 can be configured without providing the D/A conversion unit 68.

The frame memory 69 temporarily stores the decoded image supplied from the ALF 82. The frame memory 69 supplies the decoded image to the selection unit 70 as a reference image to be used for generating the predicted image at a predetermined timing or on the basis of an external request of the intra-prediction unit 71, the motion prediction/compensation unit 72, or the like.

The selection unit 70 selects the supply destination of the reference image supplied from the frame memory 69. When decoding the image encoded by the intra-prediction, the selection unit 70 supplies the reference image supplied from the frame memory 69 to the intra-prediction unit 71. When decoding the image encoded by the inter-prediction, the selection unit 70 supplies the reference image supplied from the frame memory 69 to the motion prediction/compensation unit 72.

The intra-prediction unit 71 performs intra-prediction using the reference image supplied from the frame memory 69 via the selection unit 70 in the intra prediction mode used in the intra-prediction unit 34 of FIG. 4 according to the prediction mode included in the encoding information supplied from the lossless decoding unit 62. The intra-prediction unit 71 supplies the predicted image obtained by the intra-prediction to the selection unit 73.

The motion prediction/compensation unit 72 performs inter-prediction using the reference image supplied from the frame memory 69 via the selection unit 70 in the inter-prediction mode used in the motion prediction/compensation unit 35 of FIG. 4 according to the prediction mode included in the encoding information supplied from the lossless decoding unit 62. Inter-prediction is performed using motion information or the like included in the encoding information supplied from the lossless decoding unit 62 as necessary.

The motion prediction/compensation unit 72 supplies the predicted image obtained by the inter-prediction to the selection unit 73.

The selection unit 73 selects the predicted image supplied from the intra-prediction unit 71 or the predicted image supplied from the motion prediction/compensation unit 72, and supplies the predicted image to the calculation unit 65.

The DF 31*b* applies the DF to the decoded image from the calculation unit 65 according to the filter parameters and the like included in the encoding information supplied from the lossless decoding unit 62, and supplies the decoded image (filter image) to which the DF is applied, or the decoded image (filter image) to which the DF is not applied to the adaptive offset filter 81.

The adaptive offset filter 81 applies an adaptive offset filter to the decoded image from the DF 31*b* as necessary according to the filter parameters included in the encoding information supplied from the lossless decoding unit 62, and supplies the decoded image (filter image) to which the adaptive offset filter is applied or the decoded image to which the adaptive offset filter is not applied to the ALF 82.

The ALF 82 applies ALF to the decoded image from the adaptive offset filter 81 as necessary; and supplies the decoded image to which ALF is applied or the decoded image to which ALF is not applied to the screen rearrangement buffer 67 and the frame memory 69.

In the decoder 51 configured as described above, the lossless decoding unit 62, the inverse quantization unit 63, the inverse orthogonal transform unit 64, and the calculation unit 65 function as a decoding unit that decodes the encoded bitstream to generate an image (decoded image).

<Decoding Process>

Figure 7:
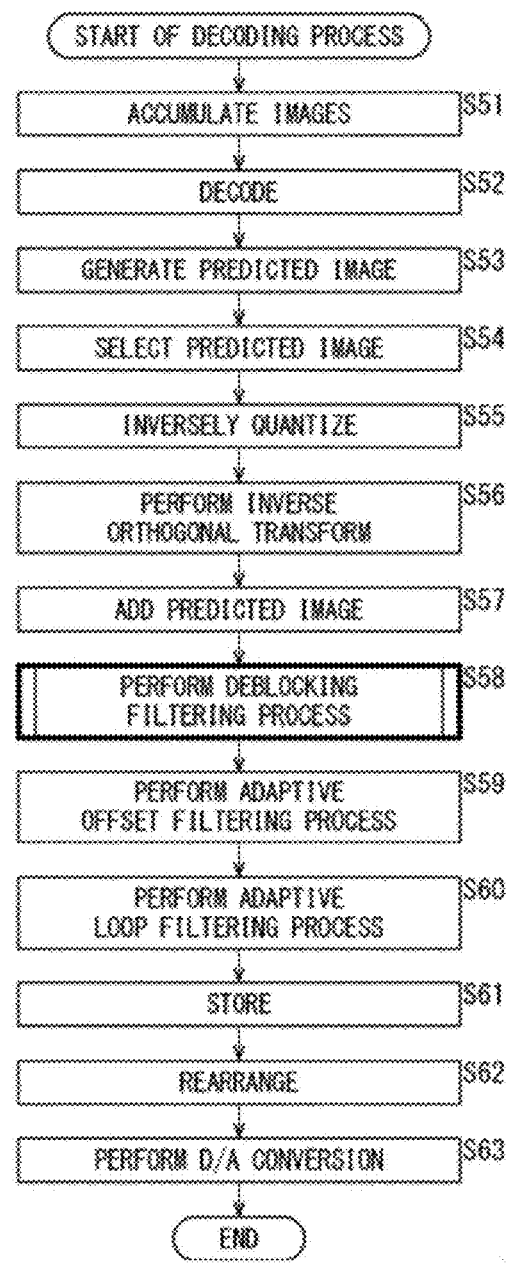
FIG. 7 is a flowchart illustrating an example of a decoding process of the decoder 51.

FIG. 7 is a flowchart illustrating an example of the decoding process of the decoder 51 of FIG. 6.

In the decoding process, in step S51, the accumulation buffer 61 temporarily accumulates the encoded bitstream transmitted from the encoder 11 and supplies the same to the lossless decoding unit 62 as appropriate, and the process proceeds to step S52.

In step S52, the lossless decoding unit 62 receives and decodes the encoded bitstream supplied from the accumulation buffer 81, and supplies the quantization coefficient as the encoded data included in the decoding result of the encoded bitstream to the inverse quantization unit 63.

The lossless decoding unit 62 parses the encoding information included in the decoding result of the encoded bitstream. The lossless decoding unit 62 supplies the necessary encoding information to the intra-prediction unit 71, the motion prediction/compensation unit 72, the DF 31*b*, the adaptive offset filter 81, and other necessary blocks.

The process proceeds from step S52 to step S53, and the intra-prediction unit 71 or the motion prediction/compensation unit 72 performs an intra-prediction process or an inter-motion prediction process for generating a predicted image according to the reference image supplied from the frame memory 69 via the selection unit 70 and the encoding information supplied from the lossless decoding unit 62. The intra-prediction unit 71 or the motion prediction/compensation unit 72 supplies the predicted image obtained by the intra-prediction process or the inter-motion prediction process to the selection unit 73, and the process proceeds from step S53 to step S54.

In step S54, the selection unit 73 selects the predicted image supplied from the intra-prediction unit 71 or the motion prediction/compensation unit 72, supplies the predicted image to the calculation unit 65, and the process proceeds to step S55.

In step S55, the inverse quantization unit 63 inversely quantizes the quantization coefficient from the lossless decoding unit 62, supplies the resulting orthogonal transform coefficient to the inverse orthogonal transform unit 64, and the process proceeds to step S56.

In step S56, the inverse orthogonal transform unit 64 performs inverse orthogonal transform on the orthogonal transform coefficient from the inverse quantization unit 63, supplies the resulting residue to the calculation unit 65, and the process proceeds to step S57.

In step S57, the calculation unit 65 generates a decoded image by adding the residue from the inverse orthogonal transform unit $4 and the predicted image from the selection unit 73. The calculation unit 65 supplies the decoded image to the DF 31*b*, and the process proceeds from step S57 to step S58.

In step S58, the DF 31*b* applies the DF to the decoded image from the calculation unit 65 according to the filter parameters included in the encoding information supplied from the lossless decoding, unit 62, and supplies the resulting filter image to the adaptive offset filter 81, and the process proceeds to step S59.

In step S59, the adaptive offset filter 81 applies the adaptive offset filter to the filter image from the DF 31*b* according to the filter parameters included in the encoding information supplied from the lossless decoding unit 62, and supplies the resulting filter image to the ALF 82, and the process proceeds to step S60.

The ALF 82 applies the ALF to the filter image from the adaptive offset filter 81, and supplies the resulting filter image to the screen rearrangement buffer 67 and the frame memory 69, and the process proceeds to step S61.

In step S61, the frame memory 69 temporarily stores the filter image supplied from the ALF 82, and the process proceeds to step S62. The filter image (decoded image) stored in the frame memory 69 is used as a reference image which is the source from which the predicted image is generated in the intra-prediction process or the inter-motion prediction process in step S53.

In step S62, the screen rearrangement buffer 67 rearranges the filter images supplied from the ALF 82 in the display order and supplies the same to the D/A conversion unit 68, and the process proceeds to step S63.

In step S63, the D/A conversion unit 68 D/A-converts the filter image from the screen rearrangement buffer 67, and the decoding process ends. The filter image (decoded image) after D/A conversion is output to and displayed on a display (not shown).

<Configuration Example of DF 31*a*>

Figure 8:
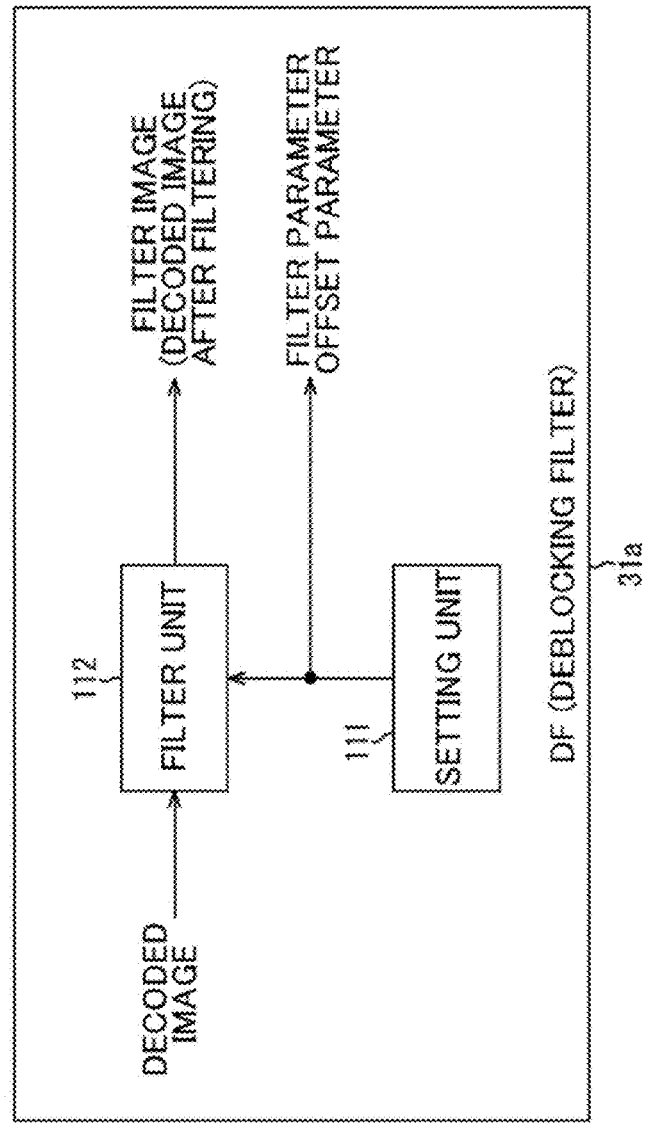
FIG. 8 is a block diagram showing a configuration example of DF 31*a*.

FIG. 8 is a block diagram showing a configuration example of the DF 31*a* of the encoder 11.

Here, in the following, for the DF, for example, it is assumed that two sets of offset parameter sets are set in total, one set of offset parameter sets for the luminance component and one set of offset parameter sets for the color difference component. Then, from the two sets of offset parameter sets, the offset parameter set for the luminance component is used as the current offset parameter set for the luminance component, and the offset parameter set for the color difference component is used as the current offset parameter set for the color difference component.

In FIG. 8, the DF 31*a* has a setting unit 111 and a filter unit 112.

The setting unit 111 sets the filter parameters tc and beta of the DF applied to the block boundary of the blocks of the decoded images, and the offset parameter set for adjusting the filter parameters tc and beta.

As for the offset parameter set, the setting unit 111 sets two sets of offset parameter sets in total, one set of offset parameter sets for the luminance component and one set of offset parameter sets for the color difference component.

The offset parameter set for each of the luminance component and the color difference component can be set according to, for example, an encoding parameter, an image feature amount detected from the luminance component and the color difference component, a predetermined cost function, and the like.

The filter parameters tc and beta set by the setting unit 111 and the two sets of offset parameter sets are supplied to the filter unit 112 and the lossless encoding unit 26.

In the lossless encoding unit 26, the filter parameters tc and beta from the setting unit 111, and two sets of offset parameter sets are set (included) in the syntax of the encoded bitstream (for example, the picture parameter set and the slice header).

The filter unit 112 is supplied with filter parameters tc and beta from the setting unit 111 and two sets of offset parameter sets as well as the decoded image from the calculation unit 30.

The filter unit 112 applies the DF (filtering by the DF) to the pixels near the block boundary of the decoded image from the calculation unit 30 using the filter parameters tc and beta from the setting unit 111.

In the application of the DF, filter determination is performed. In the filter determination, the presence/absence of application of DF and the type of DF to be applied when DF is applied are determined. Examples of the type of DF include a long-tap filter, a strong filter, and a weak filter.

When applying the DF to the pixels near the block boundary, the type of DF determined to be applied in the filter determination is applied.

In the application of the DF including the filter determination, the current offset parameter set is selected for each of the luminance component and the color difference component of the decoded image from the two sets of offset parameter sets from the setting unit 111.

That is, for the luminance component, the offset parameter set for the luminance component is selected as the current offset parameter set. For the color difference component, the offset parameter set for the color difference component is selected as the current offset parameter set.

For the luminance component, the filter parameters tc and beta are adjusted using the current offset parameter set selected for the luminance component, that is, the offset parameter set for the luminance component.

For the color difference component, the filter parameters tc and beta are adjusted using the current offset parameter set selected for the color difference component, that is, the offset parameter set for the color difference component.

Using the adjusted filter parameters tc and beta, DF is applied to each of the luminance component and the color difference component of the pixel near the block boundary of the decoded image.

The filter unit 112 generates a filter image by applying the DF and supplies the same to the adaptive offset filter 41.

<Configuration Example of DF 31*b*>

Figure 9:
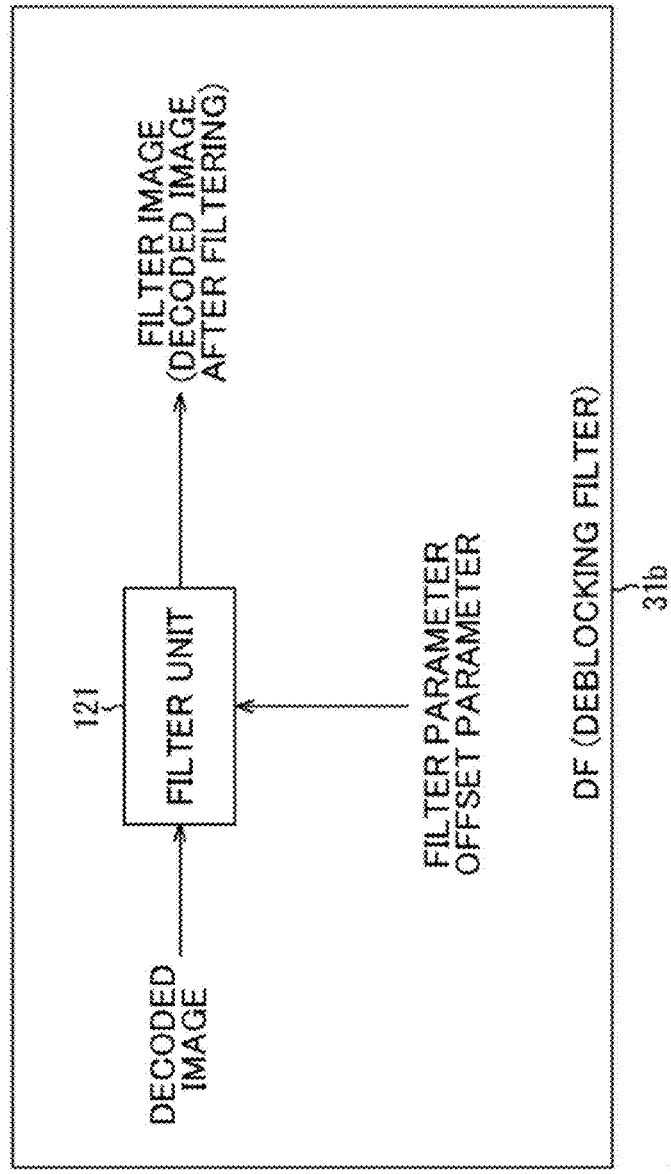
FIG. 9 is a block diagram showing a configuration example of DF 31*b*.

FIG. 9 is a block diagram showing a configuration example of the DF 31*b* the decoder 51.

In FIG. 9, the DF 31*b* has a filter unit 121.

The filter unit 121 is supplied with the filter parameters tc and beta and two sets of offset parameter sets parsed from the lossless decoding unit 62. Further, the decoded image is supplied to the filter unit 121 from the calculation unit 65.

The filter unit 121 applies the DF the pixels near the block boundary of the decoded image from the calculation unit 65 using the filter parameters tc and beta from the lossless decoding unit 62. The filter unit 121 generates a filter image by applying the DF and supplies the same to the adaptive offset filter 81.

Since the application of the DF in the filter unit 121 is performed in the same manner as in the filter unit 112 in FIG. 8, the description thereof will be omitted.

Syntax>

FIG. 10 is a diagram showing an example of the syntax of the picture parameter set when two sets of offset parameter sets are included in the picture parameter set.

In FIG. 10, pps_beta_offset0_div2 and pps_tc_offset0_div2 are one set of offset parameter sets that adjust the filter parameters beta and tc, respectively, and pps_beta_offset1_div2 and pps_tc_offset1_div2 are another set of offset parameter sets that adjust the filter parameters beta and tc, respectively.

For example, pps_beta_offset0_div2 and pps_tc_offset0_div2 are the offset parameter sets for the luminance component, and pps_beta_offset1_div2 and pps_tc_offset1_div2 are the offset, parameter sets for the color difference component.

In FIG. 10, deblocking_offset_component_use_flag is a flag indicating whether two sets of offset parameter sets, pps_beta_offset0_div2 and pps_tc_offset0_div2, and pps_beta_offset1_div2 and pps_tc_offset1_div2 are offset parameter sets for the luminance component and the color difference component, respectively.

For example, when deblocking_offset_component_use_flag is 1 (true), it indicates that the two sets of offset parameter sets, pps_beta_offset0_div2 and pps_tc_offset0_div2, and pps_beta_offset1_div2 and pps_tc_offset1_div2 are offset parameter sets for the luminance component and the color difference component, respectively.

If deblocking_offset_component_use_flag is not 1, that is, 0 (false), the two sets of offset parameter sets, pps_beta_offset0_div2 and pps_tc_offset0_div2 and pps_beta_offset1_div2 and pps_tc_offset1_div2 can be used as encoding parameters, for example, a plurality of offset parameter sets which is a selection target when selecting a current offset parameter set according to the block size.

In this case, a threshold for encoding parameters can be included in the picture parameter set as a selection criterion for selecting pps_beta_offset0_div2 and pps_tc_offset0_div2 or pps_beta_offset1_div2 and pps_tc_offset1_div2.

In FIG. 10, pps_tc_beta_offset_switched_threshold represents a threshold for the encoding parameter.

For example, if pps_tc_beta_offset_switched_threshold is the threshold of the block size, when the block size of the block that constitutes the block boundary to which DF is applied is equal to or greater than the threshold pps_tc_beta_offset_switched_threshold, one of the two sets of offset parameter sets, pps_beta_offset0_div2 and pps_tc_offset0_div2, and pps_beta_offset1_div2 and pps_tc_offset1_div2 is selected.

On the other hand, if the block size of the block is not equal to or greater than the threshold pps_tc_beta_offset_switched_threshold, the other of the two sets of offset parameter sets, pps_beta_offset0_div2 and pps_tc_offset0_div2, and pps_beta_offset1_div2 and pps_tc_offset1_div2 is selected.

The flag deblocking_offset_component_use_flag and the threshold pps_tc_beta_offset_switched_threshold are set in the setting unit 111 and included in the picture parameter set in the lossless encoding unit 26.

FIG. 11 is a diagram showing an example of the syntax of the slice header syntax when two sets of offset parameter sets are included in the slice header.

In FIG. 11, slice_beta_offset0_div2, slice_tc_offset0_div2, slice_beta_offset1_div2, slice_tc_offset1_div2, and slice_tc_beta_offset_switched_threshold correspond to pps_beta_offset0_div2, pps_tc_offset0_div2, pps_beta_offset1_div2, pps_tc_offset1_div2, and pps_tc_beta_offset_switched_threshold in FIG. 10, respectively.

Here, for the DF, for example, it is assumed that two sets of offset parameter sets are set in total, one set of offset parameter sets for the luminance component and one set of offset parameter sets for the color difference component, the offset parameter set for the luminance component is used as the current offset parameter set for the luminance component, and the offset parameter set for the color difference component is used as the current offset parameter set for the color difference component.

However, for the DF, as described in FIG. 2, three sets of offset parameter sets for each component of YUV or YCbCr may be set, and the offset parameter set for each component may be set as the current offset parameter for each component.

In this case, the picture parameter set of FIG. 10 and the slice header of FIG. 11 may include three sets of offset parameter sets for each component of YUV or YCbCr.

When a plurality of sets of offset parameter sets included in the picture parameter set are fixed to the offset parameter set for each of the luminance component and the color difference component, or the offset parameter set for each component, the picture parameter set in FIG. 10 can be configured without deblocking_offset_component_use_flag and pps_tc_beta_offset_switched_threshold. Similarly, the slice header of FIG. 11 can be configured without deblocking_offset_component_use_flag and slice_tc_beta_offset_switched_threshold.

<Description of Computer to which Present Technology is Applied>

A series of processing described above can be executed by hardware or software. In a case where the series of processing is executed by software, a program that configures the software is installed in a general-purpose computer or the like.

Figure 12:
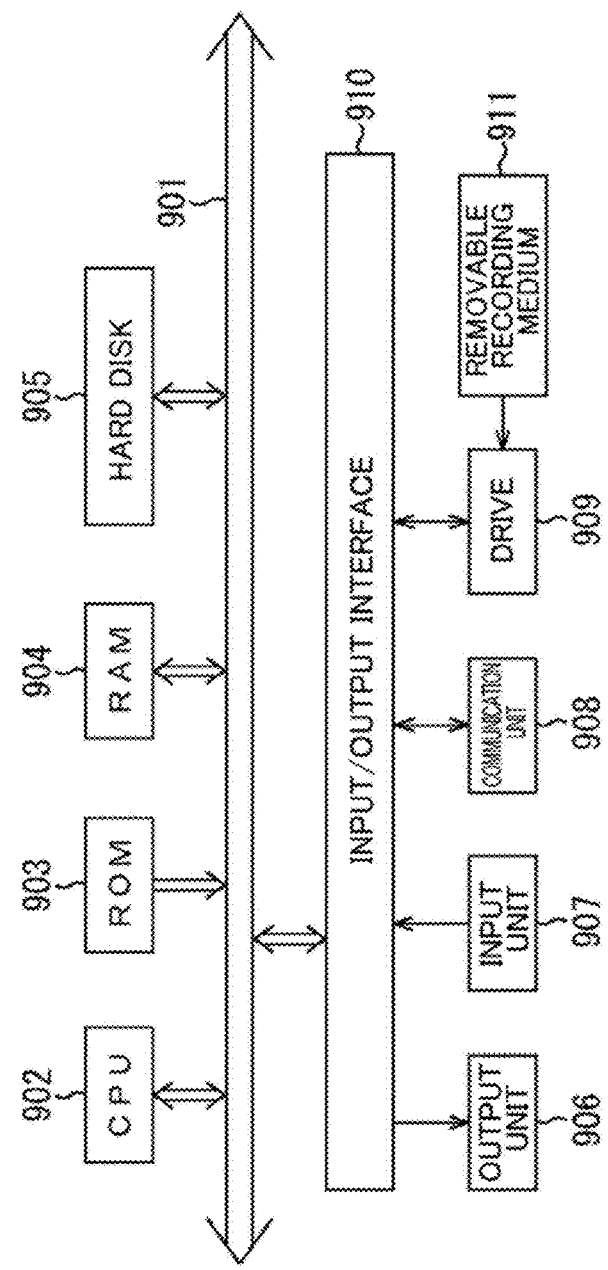
FIG. 12 is a block diagram showing an example of a configuration of one embodiment of a computer to which the present technology is applied.

FIG. 12 is a block diagram showing an example of a configuration of an embodiment of a computer in which a program for executing the aforementioned series of processing is installed.

The program can be recorded in advance in a hard disk 905 or a ROM 903 as a recording medium included in the computer.

Alternatively, the program can be stored (recorded) in a removable recording medium 911 driven by a drive 909. This removable recording medium 911 can be provided as so-called package software. Here, there is a flexible disk, a compact disc read only memory (CD-ROM), a magneto optical (MO) disk, a digital versatile disc (DVD), a magnetic disk, a semiconductor memory, or the like, for example, as the removable recording medium 911.

Note that the program can be downloaded to the computer through a communication network or a broadcast network and installed in the hard disk 905 included in the computer in addition to being installed from the aforementioned removable recording medium 911 to the computer. That is, the program can be transmitted from a download site to the computer through an artificial satellite for digital satellite broadcast in a wireless manner or transmitted to the computer through a network such as a local area network (LAN) or the Internet in a wired manner, for example.

The computer includes a central processing unit (CPU) 902 and an input output interface 910 is connected to the CPU 902 through a bus 901.

When a user operates the input unit 907, or the like to input a command through the input/output interface 910, the CPU 902 executes a program stored in the read only memory (ROM) 903 according to the command. Alternatively, the CPU 902 loads a program stored in the hard disk 905 to a random access memory (RAM) 904 and executes the program.

Accordingly, the CPU 902 performs processing according to the above-described flowcharts or processing executed by components of the above-described block diagrams. In addition, the CPU 902, for example, outputs a processing result from an output unit 900 through the input/output interface 910 or transmits the processing result from a communication unit 908 and additionally records the processing result in the hard disk 905, or the like as necessary.

Note that the input unit 907 is configured as a keyboard, a mouse, a microphone, or the like. In addition, the output unit 906 is configured as a liquid crystal display (LED), a speaker, or the like.

Here, processing executed by a computer according to a program is not necessarily performed according to a sequence described as a flowchart in the present description. That is, processing executed by a computer according to a program also includes processing executed in parallel or individually (e.g., parallel processing or processing according to objects).

In addition, a program may be processed by a single computer (processor) or may be processed by a plurality of computers in a distributed manner. Further, a program may be transmitted to a distant computer and executed.

Further, in the present description, the system means a set of a plurality of components (devices, modules (parts), etc.), and it does not matter whether or not all the components are arranged in a single housing. Therefore, a plurality of devices housed in separate housings and connected via a network, and one device in which a plurality of modules are housed in one housing are both systems.

Note that embodiments of the present technology are not limited to the above-mentioned embodiments and can be modified in various manners without departing from the gist of the present technology.

For example, the present technology can be configured as cloud computing in which one function is shared and processed in common by a plurality of devices via a network.

Further, the respective steps described in the above-described flowchart can be executed by one device or in a shared manner by a plurality of devices.

Furthermore, in a case where a plurality of kinds of processing are included in a single step, the plurality of kinds of processing included in the single step may be executed by one device or by a Plurality of devices in a shared manner.

The effects described in the present description are merely illustrative and not restrictive, and other effects may be obtained.

REFERENCE SIGNS LIST

10 Image processing system
11 Encoder
21 A/D conversion unit
22 Screen rearrangement buffer 22
23 Calculation unit
24 Orthogonal transform unit
25 Quantization unit
26 Lossless encoding unit
27 Accumulation buffer
28 Inverse Quantization unit
29 Inverse orthogonal transform unit
30 Calculation unit
31a, 31b DF
32 Frame memory
33 Selection unit
34 intra-prediction unit
35 Motion prediction/compensation unit
36 Predicted image selection unit
37 Rate control unit
41 Adaptive offset filter
42 ALF
51 Decoder
61 Accumulation buffer
62 Lossless decoding unit
63 Inverse quantization unit
64 Inverse orthogonal transform unit
65 Calculation unit
67 Screen rearrangement unit
68 D/A conversion unit
69 Frame memory
70 Selection unit
71 Intra-prediction unit
72 Motion prediction/compensation unit
73 Selection unit
81 Adaptive offset filter
82 ALF
111 Setting unit
112, 121 Filter unit
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. An image processing device comprising:
a decoder that decodes a bitstream to generate a decoded image; and
a filter that
applies a deblocking filter to a color difference component of pixels near a block boundary of the decoded image generated by the decoder using a color difference offset parameter set used when applying a deblocking filter to the color difference component of pixels near the block boundary of the decoded image generated by the decoder, wherein the pixels near the block boundary of the decoded image are pixels located within a range in which the deblocking filter is applied to the block boundary, and
applies the deblocking filter to a first color difference component and a second color difference component of the pixels near the block boundary of the decoded image generated by the decoder using a first color difference offset parameter set used when applying a deblocking filter to the first color difference component of the decoded image and a second color difference offset parameter set used when applying a deblocking filter to the second color difference component of the decoded image.

2. The image processing device according to claim 1, wherein
when a color space for the decoded image is YUV,
the first color difference offset parameter set is an offset parameter set used for a U component of the decoded image, and
the second color difference offset parameter set is an offset parameter set used for a V component of the decoded image.

3. The image processing device according to claim 1, wherein
when a color space for the decoded image is YCbCr,
the first color difference offset parameter set is an offset parameter set used for a Cb component of the decoded image, and
the second color difference offset parameter set is an offset parameter set used for a Cr component of the decoded image.

4. The image processing device according to claim 1, wherein
the first color difference offset parameter set and the second color difference offset parameter set are set as the syntax of the bitstream, and
the decoder parses the first color difference offset parameter set and the second color difference offset parameter set included in the bitstream.

5. The image processing device according to claim 4, wherein the syntax is a picture parameter set or a slice header.

6. The image processing device according to claim 4, wherein the syntax is a picture parameter set and a slice header.

7. The image processing device according to claim 1, wherein the filter applies the deblocking filter to a luminance component of pixels near the block boundary of the decoded image generated by the decoder using a luminance offset parameter set used when applying a deblocking filter to the luminance component of the decoded image.

8. An image processing method comprising:
decoding a bitstream to generate a decoded image;
applying a deblocking filter to a color difference component of pixels near a block boundary of the decoded image generated by the decoding using a color difference offset parameter set used when applying a deblocking filter to the color difference component of pixels near the block boundary of the decoded image generated by the decoding, wherein the pixels near the block boundary of the decoded image are pixels located within a range in which the deblocking filter is applied to the block boundary; and
applying the deblocking filter to a first color difference component and a second color difference component of the pixels near the block boundary of the decoded image generated by the decoder using a first color difference offset parameter set used when applying a deblocking filter to the first color difference component of the decoded image and a second color difference offset parameter set used when applying a deblocking filter to the second color difference component of the decoded image.

9. An image processing device comprising:
circuitry that sets a color difference offset parameter set used when applying a deblocking filter to a color difference component of a decoded image obtained by decoding a bitstream; and
an encoder that encodes an image to generate the bitstream including the color difference offset parameter set set by the circuitry,
wherein the circuitry sets a first color difference offset parameter set used when applying a deblocking filter to a first color difference component of the decoded image and a second color difference offset parameter set used when applying a deblocking filter to a second color difference component of the decoded image,
the encoder generates the bitstream including the first color difference offset parameter set and the second color difference offset parameter set set by the circuitry,
when a color space for the decoded image is YUV
the first color difference offset parameter set is a parameter set used for a U component of the decoded image, and
the second color difference offset parameter set is a parameter set used for a V component of the decoded image, and when a color space for the decoded image is YCbCr,
the first color difference offset parameter set is an offset parameter set used for a Cb component of the decoded image, and
the second color difference offset parameter set is an offset parameter set used for a Cr component of the decoded image.

10. The image processing device according to claim 9, wherein the encoder generates the bitstream including the first color difference offset parameter set and the second color difference offset parameter set set by the circuitry as syntax.

11. The image processing device according to claim 10, wherein the syntax is a picture parameter set or a slice header.

12. The image processing device according to claim 10, wherein the syntax is a picture parameter set and a slice header.

13. The image processing device according to claim 9, wherein
the circuitry sets a luminance offset parameter set used when applying a deblocking filter to a luminance component of the decoded image, and
the encoder generates the bitstream including the luminance offset parameter set set by the circuitry.

14. The image processing device according to claim 9, further comprising:
a filter that applies a deblocking filter to a color difference component of pixels near the block boundary of a locally decoded image locally decoded when encoding using the color difference offset parameter set to generate a filter image, wherein the encoder encodes the image using the filter image generated by the filter.

15. An image processing method comprising:
setting a color difference offset parameter set used when applying a deblocking filter to a color difference component of a decoded image obtained by decoding a bitstream;
encoding an image to generate a bitstream including the color difference offset parameter set set by the setting;
setting a first color difference offset parameter set used when applying a deblocking filter to a first color difference component of the decoded image and a second color difference offset parameter set used when applying a deblocking filter to a second color difference component of the decoded image; and
generating the bitstream including the first color difference offset parameter set and the second color difference offset parameter set set by the circuitry,
when a color space for the decoded image is YUV,
the first color difference offset parameter set is a parameter set used for a U component of the decoded image, and
the second color difference offset parameter set is a parameter set used for a V component of the decoded image, and
when a color space for the decoded image is YCbCr,
the first color difference offset parameter set is an offset parameter set used for a Cb component of the decoded image, and
the second color difference offset parameter set is an offset parameter set used for a Cr component of the decoded image.

* * * * *